United States Patent [19]
Elliott et al.

[11] Patent Number: 5,929,437
[45] Date of Patent: Jul. 27, 1999

[54] ENCAPSULATED RADIOACTIVE TRACER

[75] Inventors: Douglas W. Elliott, Sugar Land, Tex.;
David L. Holcomb, Denver, Colo.

[73] Assignee: Protechnics International, Inc., Houston, Tex.

[21] Appl. No.: 08/859,144

[22] Filed: May 20, 1997

Related U.S. Application Data

[63] Continuation of application No. 08/516,640, Aug. 18, 1995, abandoned.
[51] Int. Cl.$^6$ ............................................. G01V 5/04
[52] U.S. Cl. ..................... 250/259; 250/260; 250/302; 250/303
[58] Field of Search .................... 250/259, 260, 250/356.1, 356.2, 302, 303; 252/645

[56] References Cited

U.S. PATENT DOCUMENTS

| | | | |
|---|---|---|---|
| 3,492,147 | 1/1970 | Young et al. | 117/62.2 |
| 3,796,883 | 3/1974 | Smith et al. | |
| 4,199,680 | 4/1980 | Moon | 250/260 |
| 4,731,531 | 3/1988 | Handke | |
| 5,243,190 | 9/1993 | Bandy et al. | |
| 5,322,126 | 6/1994 | Scott, III | 166/308 |

OTHER PUBLICATIONS

Caldwell "Tracers in Oil Wells: A Review of Recent Advances," Nucleonics, vol. 19, No. 2, Feb. 1961, pp. 58–72.
Smithm William, F., Principles of Materials Science and Engineering, McGraw Hill, pp. 350 and 360, 1986.
M.P. Cleary et al., "Major New Developments in Hydraulic Fracturing, with Documented Reductions in Job Costs and Increases in Normalized Production," Soc. of Petrol. Engr. SPE 28565 (1994).
J.W. Ely et al., "Evaluation of a Crosslinked CMHEC Fracturing Fluid in Stimulation of Fruitland Coal Seams in the San Juan Basin," Soc. of Petrol. Engr. SPE 28582 (1994).

K. Fisher et al., "Radioactive Tracers Facilitate Stimulation Job Evaluation," *Petroleum Engineer Int'l*, Feb. 1995, pp. 51–53.
G.W. Voneiff et al., "Radioactive Tracers Improve Completion and Fracturing Practices," *Petroleum Engineer Int'l*, Mar. 1995, pp. 25–29.
L.L. Gadeken et al., "Improved Evaluation Techniques for Multiple Radioactive Tracer Applications," 12th Int'l Logging Symposium of SAID, Paris, France, Oct. 1989.
J.L. Hunter et al., "Service company alliance reduces tight sands frac costs," *Oil & Gas Journal*, (Aug. 15, 1994) pp. 89–91.
R.G. Keck et al., "A Field Demonstration of Hydraulic Fracturing for Solids Waste Injection with Real–Time Passive Seismic Monitoring," SPE 28495, Soc. of Petrol. Engr 69th Annual Techn. Conf., New Orleans, LA (Sep. 25–28, 1994), pp. 319–334.
M.E. Mullen et al., "Evaluation of Bottom Hole Pressures in 40 Soft Rock Frac–Pack Completions in the Gulf of Mexico," SPE 28532, Soc. of Petrol. Engr Annual Technical Conf., New Orleas, LA (Sep. 25–28, 1994), pp. 153–166.
Y.K. Patel et al., "High–Rate Pre–Packing Using Non–Viscous Carrier Fluid Results in Higher Production Rates in South Pass Block 61 Field," SPE 28531, Soc. of Petrol. Engr 69th Annual Techn. Conf., New Orleans, LA (Sep. 25–28, 1994), pp. 137–152.
Mark Reid et al., "Using Low Density Tracers to Evaluate Acid Treatment Diversion," SPE 29587, SPE Symposium, Denver, CO (Mar. 20–22, 1995), pp. 405–414.

*Primary Examiner*—Edward J. Glick
*Attorney, Agent, or Firm*—Baker & Botts, L.L.P.

[57] ABSTRACT

Radioactive particles are provided for use in tracing the flow path in or near a well of fluids injected into the well. The particles include an element which can be made radioactive by bombardment with neutrons and a material to encapsulate the element. The encapsulant is preferably an organic polymer having a high softening temperature. The particles may be injected into a well in treating fluids and their location may be later determined by gamma ray logging of the well.

18 Claims, 2 Drawing Sheets

ENCAPSULATED RADIOACTIVE TRACER

This application is a continuation, of application Ser. No. 08/516,640, filed Aug. 18, 1995, now abandoned.

BACKGROUND OF THE INVENTION

1. Field of the Invention

This invention pertains to radioactive tracers and their use in wells. More particularly, in one aspect, encapsulated particles are provided which are used for radioactive tracing. In another aspect, encapsulated radioactive particles are added to fluid injected into a well to determine the location of the traced fluid outside the casing of the well by radioactive logging of the well.

2. Description of Related Art

A variety of treating fluids are pumped into wells. Such treating fluids include acid and salt solutions, surfactant solutions, mineral-dissolving solutions, organic resins and cement slurries. In most instances, these fluids are pumped down the tubing or casing of a well and exit through a plurality of perforations in the casing. Various techniques are often used in an attempt to divert the treating fluid such that it flows uniformly through the spaced-apart perforations in the casing of the well. Such diverting techniques include slugs of gelled material, slightly soluble solids, ball sealers and mechanical devices set inside the casing. In any case, it is desirable to know where the treating fluid has entered the formation outside the casing and the relative amounts of treating fluid exiting through the different perforations. In the case of injection of cement slurry into a well, if it is used in the process of squeeze cementing it is desirable to know where the slurry that has been pumped through perforations is located. In primary cementing, it is desirable to know where the cement slurry has been placed as it is pumped down the casing and up around the outside of the casing, particularly where the top of the cement is located.

The application of radioactive materials to determine the flow path or location of fluids and solid particles injected into wells has been reviewed ("Improved Evaluation Techniques for Multiple Radioactive Tracer Applications," 12th Int'l Logging Symposium of SAID, Paris, 1989; "Radioactive Tracers Improve Completion and Fracturing Practices," Pet. Engr. Int'l., March 1995). With the development in recent years of spectral logging tools for logging different gamma ray-emitting isotopes in the same well, the use of multiple radioactive tracers injected at different times or in different injection fluids or solid particles has offered significant advantages in analysis of well conditions.

The radioactive elements can be present as a soluble compound in liquid, as insoluble or slightly soluble particles of the element (or a compound of the element) suspended in the flow stream, or as a soluble or insoluble compound attached to particles or contained within particles which are suspended in the liquid. Water-soluble compounds containing radioactive iodine have been widely used for tracing flow of fluids between wells and in the vicinity of a well. U.S. Pat. No. 5,243,190 provides an example of radioactive elements incorporated within ceramic particles and used for tracing flow of particles in wells, particularly proppant particles employed in the process of hydraulic fracturing of wells. The particles used for tracing particle flow are usually made to have about the same size and density as the particles being traced. Those radioactive particles used in hydraulic fracturing of wells are from about 100 mesh to about 20 mesh (75 micrometers to 850 micrometers) in size. The radioactive compounds are present at a relatively low concentration in the particle, so that the properties of the particle are not significantly affected by the presence of the radioactive compound. The specific activity (millicuries radioactivity per volume or mass of particles) of the particles, therefore, is relatively low. For example, in the aforereferenced U.S. Pat. No. 5,243,190, the specific activity of the particles, made from ceramic materials mixed with material which can be made radioactive by neutron bombardment, was from 0.02 to 20 millicuries (mCi) per milliliter of particles. The density of these particles was designed to be approximately the same as the density of the non-radioactive particles when applied to tracing proppant in hydraulic fracturing operations. Ceramic particles have also been used for tracing flow of add, where the density of the particles was decreased to the range of about 1.1 to 1.5 gm per ml. ("Using Low Density Tracers to Evaluate Acid Treatment Diversion," SPE 29587, Society of Petroleum Engineers, 1995). Particles made of ceramic components are difficult and expensive to manufacture in very small particle sizes, however, and are normally limited to relatively low specific activity because the radioactive element is present at low concentration in the solid particles.

For tracing the location of treating fluids around a well, water-soluble tracers in a treating fluid have two disadvantages: they are easily displaced away from the well or back into the well and they contaminate surface and well equipment. Soluble tracers produced back into a treated well at excessive concentration after the well has been treated and placed on production can present a problem of disposal of the fluid. Contamination of surface equipment or equipment used in the treating process is particularly troublesome, as it can cause hazardous conditions for personnel and require expensive cleaning procedures.

What is needed is a highly dispersed radioactive (gamma ray emitting) material which can be easily manufactured without undue hazard or expense, has a high specific activity, will flow along with treating fluids, will leave little or no contamination of surface or downhole equipment as the treating fluids are pumped into wells and will not be produced back in production fluids at high concentration.

SUMMARY OF THE INVENTION

A particle to be used in determining the flow path of fluid entering a well is provided. The particle is comprised of an encapsulated element or compound of an element which, when bombarded with neutrons, becomes a gamma ray emitter. The encapsulant is preferably an organic polymer. In one embodiment, the particle is radioactive. The specific activity of the particle is preferably greater than about 0.5 millicuries per ml of particles and the size is in the range from about 5 micrometers to about 200 micrometers. In another embodiment, a method is provided for determining the flow path of a treating fluid pumped into a well by irradiating particles containing a selected target element with neutrons, adding the particles to a treating fluid as it is injected into a well and later logging the well with a gamma ray logging tool. In yet another embodiment, non-radioactive particles are added to a treating fluid and the particles are activated by neutron bombardment after injection into a well. The treating fluid may be an add or salt solution, a resin solution, cement slurry or other fluids injected into wells.

DETAILED DESCRIPTION OF PREFERRED EMBODIMENT

Figure 1:
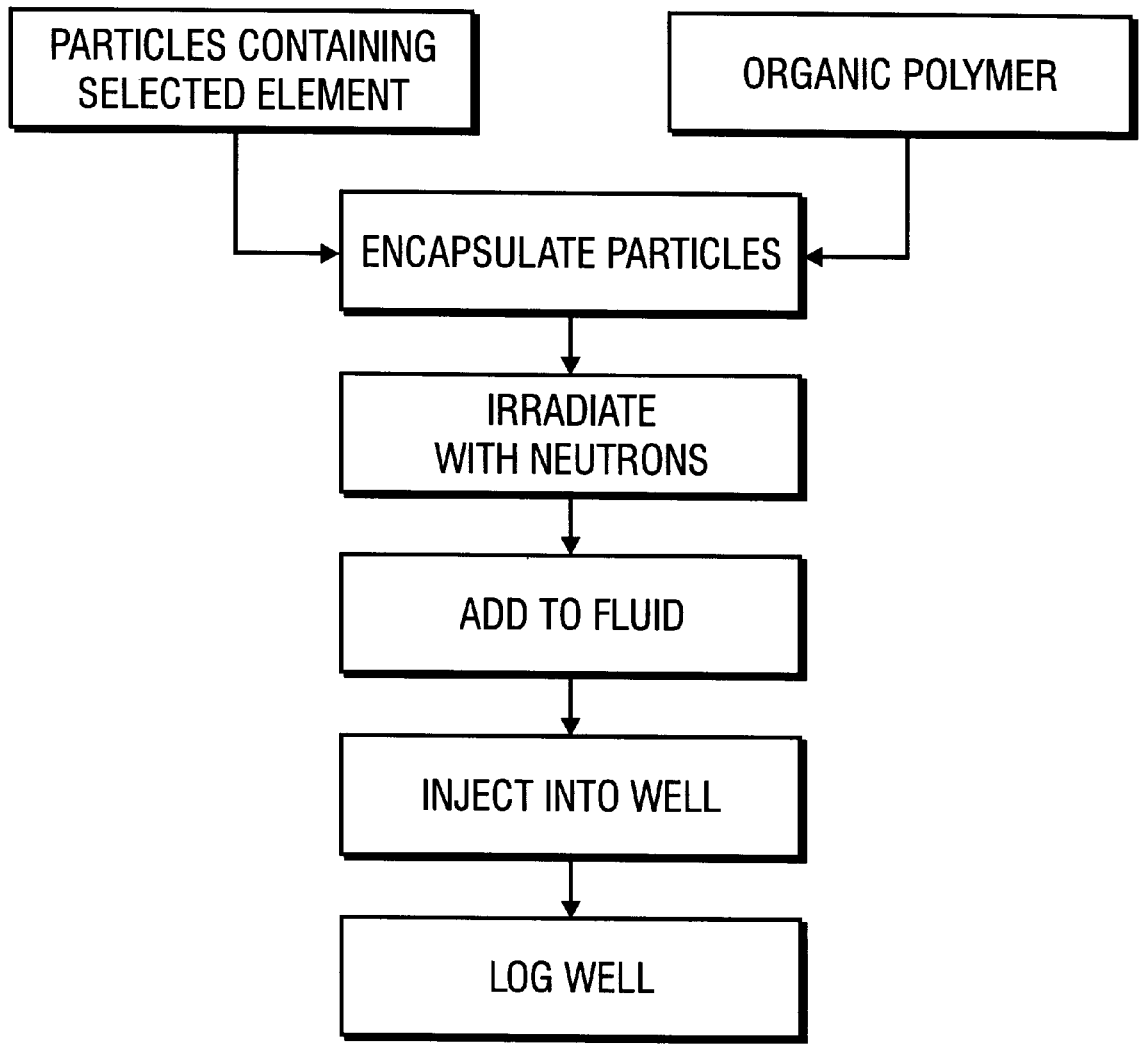
FIG. 1 is a diagram of steps for preparation and use of the radioactive material of this invention in a well.

Referring to FIG. 1, the top four boxes relate to a method of forming the material of this invention. The remaining boxes relate to one embodiment of a method for using the particles of this invention. To form the particles, an element which can be bombarded with neutrons to form a gamma ray-emitting isotope is selected. Also selected is a polymer or polymer-forming chemical which can be used to encapsulate the element and form the material of this invention.

Preferably, a solid compound of the target element (the element to be made radioactive) will be selected—most often a salt or oxide of the element. The solid compound is preferably reduced to a particle size in the range less than about 50 micrometers, and more preferably less than about 20 micrometers. The element which will be made radioactive to produce the particle of this invention is selected based on several variables. One of the important characteristics is the half-life of the radioactive isotope produced by neutron bombardment. The energies of the gamma rays emitted by the isotope are also an important factor in selecting the element. This is especially true when two or more radioactive isotopes are to be used in the same well, as it is desirable that the energy spectra of the different isotopes not excessively overlap, since the concentration of each individual isotope will be measured by spectral analysis of gamma rays. Cost and availability of the target element to be encapsulated is another consideration in the selection of the element. Target elements suitable for the particles of this invention include gold, iodine, iridium, scandium, antimony, silver, hafnium, zirconium, rubidium, chromium, iron, strontium, cobalt and zinc. Preferred target elements are antimony, iridium, scandium, silver and hafnium.

The element to be bombarded with neutrons may be present in its elemental form or as a compound. The compound may be soluble or insoluble in the treating fluid. Preferably, it will be insoluble or will have low solubility in the treating fluid.

The polymer selected may be organic or inorganic. If it is organic, it may be thermoplastic or thermoset. Preferably, it will be organic and will have a selected softening temperature higher than about 40°C. and slight or zero solubility in the treating fluid. More preferably, it will have a softening temperature higher than about 80 ° C. and most preferably it will have a softening temperature higher than about 100° C. Alternatively, precursors to a polymer along with means of polymerization or copolymerization may be selected and the polymerization reaction may occur after the particles have been coated. The materials suitable for encapsulation of solids are well-known in the art of encapsulation. The polymer may be a resin such as Poly-pale® Ester 10, a thermoplastic resin manufactured by Hercules, Inc. Poly-pale® is the glycerol ester of polymerized rosin. It has a softening point from 109 to 119° C. and a specific gravity at 25° C. of 1.08.

The method of coating the particles is selected among those methods well-known for encapsulation of solids. These include phase separation and evaporation. To coat particles using a thermoplastic resin such as Poly-pale®, the resin is dissolved in a solvent to a selected solids content, which is not critical but may be in the range of 10 to 25 percent. The solid compound to be encapsulated is then dispersed in the desired amount of resin in the resin solution. The slurry of material is fed to a rotating disc to form microspheres, which harden as the solvent evaporates. A disc speed is selected which is effective in forming the desired particles. Such means of encapsulating solid particles are well-known to those skilled in the art.

The particle size of the particles after coating or encapsulation is selected to have zero or very small settling velocity in the treating fluid to be used. Particle size range is preferably from about 5 to about 200 micrometers. Particles can be separated into desired size ranges by sieving or other particle size separation techniques.

The concentration of the compounds in the encapsulated particle will depend on the application of the particles. If the element or compound of the selected or target element is soluble in the treating fluid, it will generally be used at a lower weight percent in the total particle. The concentration of the compound to be irradiated will be from about 20% to about 90% of the total weight of the particle after encapsulation. Preferably, the concentration of the target element or compound of the element will be from about 40 percent to about 90 percent of the total weight of the particle, or the concentration of the encapsulant will be from about 10 percent to about 60 percent by weight.

In one embodiment, the solid particles after encapsulation are preferably then placed in a nuclear pile and irradiated with neutrons, although any source of neutrons may be used to bombard the element. The particles are radioactive only after irradiation with neutrons. In another embodiment, the particles are not bombarded with neutrons to be made radioactive until after they are injected into a well, at which time a neutron source is lowered into the well and the particles are activated to become radioactive.

When the particles are transported to a nuclear pile and irradiated with neutrons such that the selected element present forms a radioactive isotope of that element, the amount of neutron irradiation to achieve a desired specific activity level of the particles is determined. The method for predicting the neutron flux and radiation time necessary to achieve the desired level of radioactivity of the element is well known, and is described, for example, in U.S. Pat. No. 5,243,190, which is incorporated by reference herein. Elemental metals may be used to obtain higher activity levels per volume of radiotracer, but oxides or salts of the target element will normally be used. The compound of the target element may be mixed with other solid materials which are inert or do not produce the desired spectrum, but preferably the particles are comprised of a compound of the target element and the encapsulant.

Twenty to 40 millicuries of radioactivity is a common amount of radioactivity to produce in a nuclear pile and to transport in one batch.

Therefore, this amount of radioactivity will be used as an example. The total amount of radioactivity to be used in a particular application depends on the amount of fluid to be injected, the interval length in the well that is to be treated and the amount of radioactive material which must be injected to provide adequate logging signal, Gamma rays are detected in a wellbore only from within about a 30-inch radius beyond the outside of the casing.

Normally about 0.5 millicuries per thousand gallons to about 5 millicuries per thousand gallons is used to trace fluids injected into wells. If the tracer is used in cement, either primary or squeeze cement, the concentration of tracer will be normally less than if the fluid is add.

One of the advantages of the particles of this invention is that the particles of this invention may be transported over long distances in fluid used for acid treatments of wells without excessive settling from the fluid during pumping, even at the pumping rates used in "matrix" acid treatments. The size and density of the particles are such that settling of the particles is avoided even when the fluid is pumped through long strings of coiled tubing which is supported on a reel at the surface. Also, the density and size of the particles are such that the particles flow in a horizontal direction through perforations, even at the low rates in such matrix treatments. Another advantage of the small size of the particles, along with their high specific radioactivity, is that the particles can flow through a small microannulus if it exists between the casing and the cement sheath in the annulus and the particles can flow through small fractures in the rock. The particles may then be located outside the perforations and near the casing by gamma ray logging and they are not easily removed by subsequent add flowing into the formation as is the case with liquid tracers. Also, a very important advantage of the articles of this invention is that they are retained within the formation much more effectively than soluble tracers after a well is placed on production after a treatment. This avoids the production of radioactive material from a well at a high concentration such that it becomes a disposal problem.

The tracer particles of this invention may be used in a well for tracing a treating fluid either alone or in combination with other radioactive tracer materials. The other materials used may be in liquid or solid form. The particles of this invention may be used having different target elements in the same treatment of the same well. If more than one radioactive tracer is used in a well, spectral analysis may be used to determine the presence and amount of each tracer. Such spectral logging services are widely available in the industry from companies such as Halliburton Company, Schilumberger and Atlas Wireline Services.

Example of Particle Formation

Particles of this invention were prepared as follows: scandium oxide (99.9 percent purity) was purchased having particle size in the range of 10 micrometers and less. A solution of Poly-pale® resin in methylene chloride having a solid content of the resin of about 17% was prepared. The scandium oxide particles were then dispersed in the solution at a concentration of 75 percent oxide and 25 percent resin. The material was fed to a rotating disc operating at a speed of 12,000 rpm to form microspheres of resin and encapsulated material as the solvent evaporated. The particle size of the microspheres was in the range from about 8 to about 200 micrometers. A vial containing the particles was then placed in a nuclear pile at a position having a thermal neutron flux of approximately $1.4 \times 10^{13}$ neutrons per square centimeter per second. The epithermal-to-thermal neutron flux ratio was about 0.05. The particles were irradiated for 8 hours. At the end of this time, the vial was removed and the encapsulated scandium oxide was found to have an activity of 23 millicuries per 0.4 g of material, or 58 millicuries per gram of material.

Using the same procedure as described above but starting with antimony trioxide in place of scandium oxide, 1.6 g of material was irradiated and found to have an activity of 24.9 millicuries.

Example Application—Tracing Resin Injection

Particles prepared as described above, having particle size in the range from about 8 to about 200 microns, were used in a treatment of a well in which a resin material was injected following a fracturing treatment. During the fracturing treatment, traced particles such as described in U.S. Pat. No. 5,243,190 were used in a first and second stages of the fracturing treatment to determine which perforations were treated by the fracturing. Following the fracturing treatment, a resin-injection treatment sold by Schlumberger Dowell under the name "PROP-LOCK™" was applied. The resin used in the Prop-Lock™ process is designed to prevent proppant particles flowing back into the wellbore after the well is fractured and production begins. The isotope used to trace the proppant in the first stage of the fracturing treatment was iridium-192. It was added to the fracturing sand, in the form of ceramic particles described above, at a concentration of 0.5 millicuries per thousand pounds of sand until 30 millicuries was injected. The isotope used in the second stage of the fracturing treatment, this isotope also being contained within solid ceramic particles, was antimony-124 at a concentration of 0.4 millicuries per thousand pounds of sand. A total of 24 millicuries of antimony was injected. After the fracturing treatment and before the well was placed on production, the resin solution was injected. A total of two millicuries of scandium-46 was injected in the resinous solution. The purpose of injecting radioactive tracer in the resinous solution was to determine if all perforations of the well were treated by the resin solution, which was designed to prevent flowback of proppant from the perforations.

Figure 2:
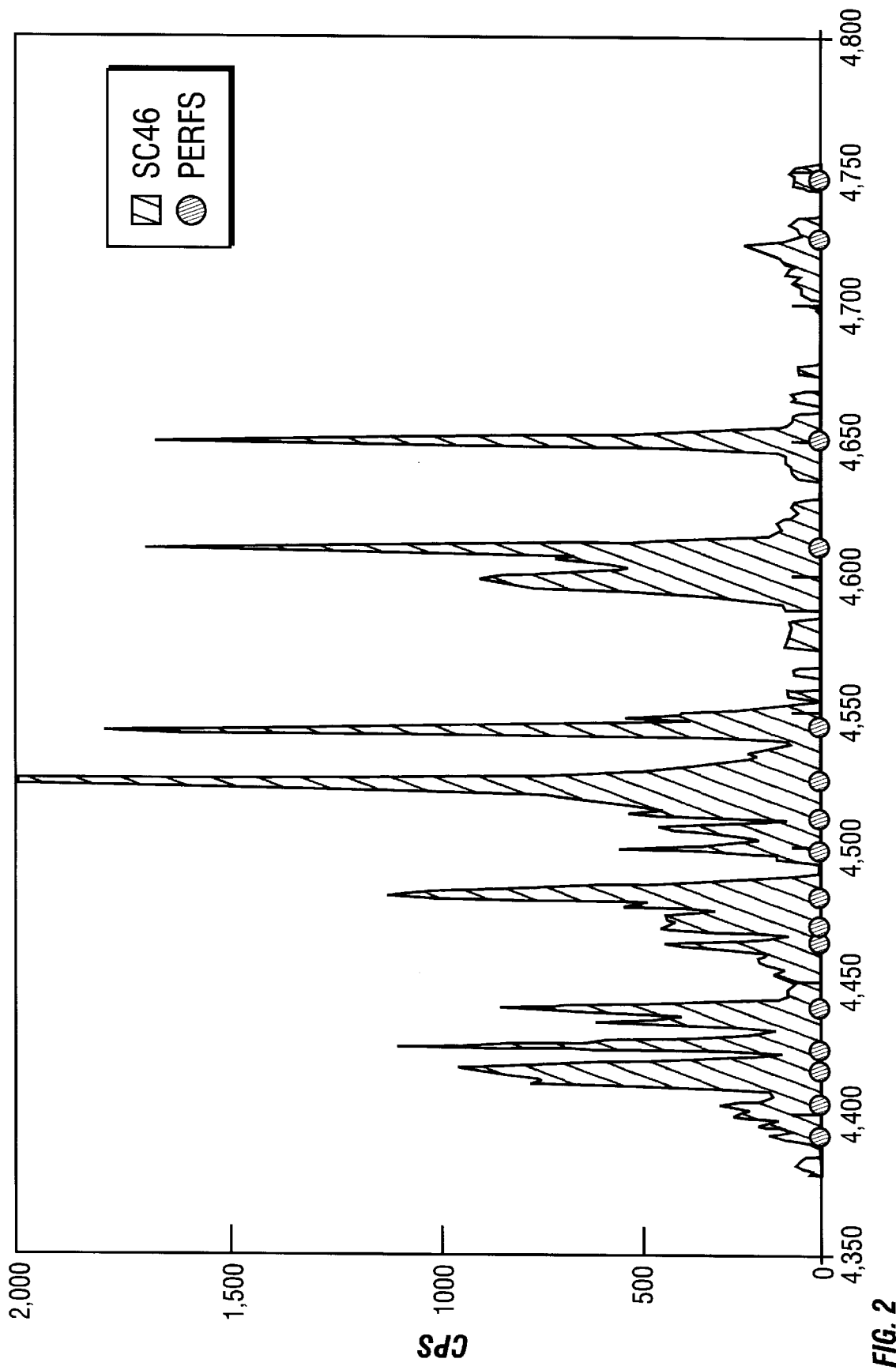
FIG. 2 is a gamma ray log of a well after treatment with the material of this invention and according to one embodiment of the method of this invention.

FIG. 2 shows a log of the well after the fracturing and injection of resinous solution. Perforations in the well are indicated by the solid areas on the vertical axis of the figure. The curve indicates counts per second from scandium-46, and shows the relative amounts of resin around different perforations of the well. Although amounts of the other tracers for the solid particles used to trace the hydraulic fracturing proppant are not shown, all the perforations were treated with proppant. The log shows that all the perforations of the well were also treated by resin, but the lower-most perforations received only a small amount of resin. The particles and method of this invention, therefore, make possible an evaluation of the potential for flow-back of proppant into the wellbore and indicate the zone from which proppant will likely be produced if it is produced into the wellbore after the well is placed on production.

Example Application—Tracing Hydrochloric Acid Injection

A two-stage matrix acid stimulation treatment is performed using a coiled tubing unit in a well drilled through a carbonate formation. The well is perforated with scattered sets of perforations over an interval of 150 feet. The add treatment is performed in two stages, with each stage being separated by a slug of polymer solution which is designed to plug the perforations which have been treated by add and divert the second stage of the add treatment to the remaining perforations. In the first stage of the treatment, scandium oxide encapsulated particles are injected at a concentration to produce an activity of 4 millicuries per 1000 gallons of add. After this stage of acid is pumped into the well, the second stage of add is traced with antimony oxide encapsulated according to the procedures described above. After the two stages of acid are pumped in the well, a spectral logging tool is lowered into the well and the activity of scandium and antimony is separately logged. The efficiency of the diversion method used for the add treatment and the sets of perforations treated by each of the first and second stage of the acid treatment are indicated by the log. Although the traced acid is injected through coiled tubing at matrix rates, at the end of the treatment there is no detectible radiation in the coiled tubing.

When the well is gas lifted to remove spent acid and water from the well and start production, the acidic water is monitored for radioactivity and sampled for later laboratory analysis. Results of the laboratory analysis show that the radioactivity level of the water is low enough to allow normal water disposal methods to be used.

Example Application—Squeeze Cementing

A squeeze cementing treatment is to be performed in a well. Ten barrels of cement slurry are to be pumped into a selected set of perforations in a three-foot interval. The cement slurry is mixed in a container at the surface and encapsulated scandium oxide particles of this invention are provided The particles are added to produce an activity of the slurry of 5 millicuries per thousand gallons. The slurry is pumped into the selected perforations at a pressure which may hydraulically fracture the formation around the well. After the slurry is injected and the excess slurry in the wellbore is washed and removed from the well, a gamma ray logging tool is lowered through the interval treated. Elevated levels of radioactivity are detected below the perforated interval treated down to the nearest water-containing sand. After the well is placed on production, the water production from the well is substantially decreased. This observation, combined with the radioactive log, leads the operator to conclude that the excess water was eliminated as a result of the squeeze cementing treatment.

The invention has been described with reference to its preferred embodiments. Those of ordinary skill in the art may, upon reading this disclosure, appreciate changes or modifications which do not depart from the scope and spirit of the invention as described above or claimed hereafter.

What we claim is:

1. A composite particle for tracing the flow path of a fluid injected into a well consisting of:
   a solid particle including a target element, the target element being made radioactive so as to emit gamma rays when bombarded with neutrons, and an organic polymer.

2. The particle of claim 1 wherein the softening temperature of the organic polymer is greater than 40° C.

3. The particle of claim 1 wherein the amount of organic polymer in the particle is in the range from about 10 percent to about 60 percent of the total weight of the particle.

4. The particle of claim 1 wherein the size of the particle is from about 5 micrometers to about 200 micrometers.

5. A radioactive particle consisting of an organic polymer and a solid particle including a target element, the target element having been made radioactive by bombardment with neutrons so as to emit gamma rays.

6. The particle of claim 5 wherein the organic polymer has a softening temperature greater than about 40° C.

7. The particle of claim 5 wherein the specific activity of the particle is greater than about 5 millicuries per ml of particles.

8. The particle of claim 5 wherein the size of the particle is in the range from about 5 micrometers to about 200 micrometers.

9. The particle of claim 5 wherein the target element is scandium or antimony.

10. A method for determining the flow path of a treating fluid pumped into a well drilled through a subterranean formation, comprising:

a) providing a solid particle including a target element or compound of the target element which when bombarded with neutrons forms a gamma ray-emitting isotope;
   b) providing an organic polymer;
   c) encapsulating the solid particle including the target element in the organic polymer to form composite particles;
   d) irradiating the composite particles with neutrons to form radioactive particles,
   e) adding the radioactive particles to a fluid before the fluid is injected into a well at a concentration effective to allow subsequent detection;
   f) injecting the fluid and the radioactive particles into a well; and
   g) logging the well with an instrument capable of detecting the radioactive particles to determine the location at which the fluid flowed out of the well or is present in the vicinity of the well.

11. The method of claim 10 wherein the concentration of radioactivity in the fluid is from about 0.5 to about 5 millcuries per thousand gallons of fluid pumped.

12. The method of claim 10 wherein the radioactive particles have a size in the range from about 5 to about 200 micrometers.

13. The method of claim 10 wherein the percentage of organic polymer in the composite particles is from about 10% to about 60% of the weight of the particles.

14. The method of claim 10 wherein the element is present as an oxide or salt of the element.

15. The method of claim 10 wherein the fluid is an acid solution.

16. The method of claim 10 wherein the fluid is a resinous solution.

17. The method of claim 10 wherein the fluid is a cement slurry.

18. A method for determining the flow path of a treating fluid pumped into a well drilled through a subterranean formation, comprising:

a) providing solid particles including an element or compound of an element which when bombarded with neutrons forms a gamma ray-emitting isotope;
   b) providing an organic polymer;
   c) encapsulating the solid particles including the element in the organic polymer to form composite particles;
   d) adding the composite particles to a fluid before the fluid is injected into a well at a concentration effective to allow subsequent detection;
   e) injecting the fluid and the composite particles into a well;
   f) irradiating the composite particles with neutrons to form radioactive particles; and
   g) logging the well with an instrument capable of detecting the radioactive particles to determine the location at which the fluid flowed out of the well or is present in the vicinity of the well.

* * * * *